US012262372B2

(12) United States Patent
Ling et al.

(10) Patent No.: US 12,262,372 B2
(45) Date of Patent: Mar. 25, 2025

(54) APPARATUS AND METHOD OF PUCCH TRANSMISSION AND RECEPTION

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 576 days.

(21) Appl. No.: 17/603,607

(22) PCT Filed: Apr. 30, 2019

(86) PCT No.: PCT/CN2019/085167
§ 371 (c)(1),
(2) Date: Oct. 14, 2021

(87) PCT Pub. No.: WO2020/220254
PCT Pub. Date: Nov. 5, 2020

(65) Prior Publication Data
US 2022/0201680 A1 Jun. 23, 2022

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/0466* (2013.01); *H04W 72/21* (2023.01)

(58) Field of Classification Search
CPC ......... H04W 72/1268; H04W 72/0466; H04W 72/21; H04W 72/0453; H04W 72/0446;
(Continued)

(56) References Cited

U.S. PATENT DOCUMENTS 11,330,587 B2 * 5/2022 Ijaz .................. H04W 72/21
2017/0064639 A1 * 3/2017 Yang ............... H04W 72/0453
(Continued)

FOREIGN PATENT DOCUMENTS

CN 110603774 B * 11/2022 .............. H04L 1/08
EP 2826184 B1 * 3/2019 ........... H04L 1/1854
(Continued)

OTHER PUBLICATIONS

CATT, Corrections to UCI feedback procedures, 3GPP TSG RAN WG1 Meeting #94, R1-1809713, Aug. 20-24, 2018.*
CATT, Corrections to UCI feedback procedures, 3GPP TSG RAN WG1 Meeting #94, R1-1809713, Aug. 20-24, 2018 (Year: 2018).*
(Continued)

*Primary Examiner* — Ayaz R Sheikh
*Assistant Examiner* — Louis Samara
(74) *Attorney, Agent, or Firm* — Kunzler Bean & Adamson

(57) ABSTRACT

Apparatus and methods of physical uplink control channel (PUCCH) transmission and reception in multiple transmit receive points (TRPs) are disclosed. The apparatus includes a transmitter for selectively transmitting a first physical uplink control channel (PUCCH) resource to a first identity, and selectively transmitting a second PUCCH resource to a second identity, wherein each one of the PUCCH resources carries a set of uplink control information (UCI); and a processor that determines whether there is an overlap between the first PUCCH resource and the second PUCCH resource.

19 Claims, 4 Drawing Sheets

(51) Int. Cl.
*H04W 72/044* (2023.01)
*H04W 72/21* (2023.01)

(58) Field of Classification Search
CPC ..... H04L 1/1812; H04L 5/0053; H04B 1/713; H04B 7/024
See application file for complete search history.

(56) References Cited

U.S. PATENT DOCUMENTS

| | | | |
|---|---|---|---|
| 2019/0081658 A1* | 3/2019 | Yamamoto | H04W 72/04 |
| 2019/0393992 A1* | 12/2019 | Xiong | H04L 1/1812 |
| 2022/0006590 A1* | 1/2022 | Wang | H04W 52/367 |
| 2023/0179377 A1* | 6/2023 | Khoshnevisan | H04L 5/001 |
| | | | 370/330 |
| 2023/0318752 A1* | 10/2023 | Gao | H04L 1/1671 |
| | | | 370/329 |

FOREIGN PATENT DOCUMENTS

| | | | | |
|---|---|---|---|---|
| JP | 7146775 B2 | * | 10/2022 | ........... H04L 1/0026 |
| WO | 2018106063 A1 | | 6/2018 | |
| WO | 2018133655 A1 | | 7/2018 | |
| WO | WO-2018232015 A1 | * | 12/2018 | ........... H04L 1/1854 |
| WO | WO-2019047950 A1 | * | 3/2019 | ............ H04B 7/024 |

OTHER PUBLICATIONS

International Searching Authority, "Written Opinion of the International Searching Authority," PCT/CN2019/085167, Jan. 20, 2020, pp. 1-4.
Ericsson, DL multi-TRP and multi-panel transmission, 3GPP TSG-RAN WG1 Meeting #90, R1-1714275, Aug. 21-25, 2017, pp. 1-7, Prague, Czech Republic.
CATT, Corrections to UCI feedback procedures, 3GPP TSG RAN WG1 Meeting #94, R1-1809713, Aug. 20-24, 2018, pp. 1-24, Gothenburg, Sweden.

* cited by examiner

APPARATUS AND METHOD OF PUCCH TRANSMISSION AND RECEPTION

FIELD

The subject matter disclosed herein relates generally to wireless communication, and more particularly relates to, but not limited to, apparatus and methods of physical uplink control channel (PUCCH) transmission and reception in multiple transmit receive points (TRPs).

BACKGROUND

The following abbreviations and acronyms are herewith defined, at least some of which are referred to within the following description.

Third Generation Partnership Project ("3GPP"), 5th Generation ("5G"), New Radio ("NR"), 5G Node B ("gNB"), Long Term Evolution ("LTE"), LTE Advanced ("LTE-A"), Evolved Node B ("eNB"), Universal Mobile Telecommunications System ("UMTS"), Worldwide Interoperability for Microwave Access ("WiMAX"), Evolved UMTS Terrestrial Radio Access Network ("E-UTRAN"), Wireless Local Area Networking ("WLAN"), Orthogonal Frequency Division Multiplexing ("OFDM"), Single-Carrier Frequency-Division Multiple Access ("SC-FDMA"), Downlink ("DL"), Uplink ("UL"), User Entity/Equipment ("UE"), Network Equipment ("NE"), millimeter Wave ("mmWave"), Frequency Range ("FR"), Hybrid Automatic Repeat Request ("HARQ"), Acknowledgement ("ACK"), Hybrid Automatic Repeat Request Acknowledgement ("HARQ-ACK"), Hybrid Automatic Repeat Request Negative Acknowledgement ("HARQ-NACK"), Radio Access Technology ("RAT"), Negative Acknowledgement ("NACK"), Receive ("RX"), Transmit ("TX"), Downlink Control Information ("DCI"), Physical Downlink Control Channel ("PDCCH"), Very-large-scale Integration ("VLSI"), Frequency Division Multiple Access ("FDMA"), Multiple-Input Multiple-Output ("MIMO"), Multi-User MIMO ("MU-MIMO"), Physical Uplink Control Channel ("PUCCH"), Channel State Information Reference Signal ("CSI-RS"), control-resource set ("coreset"), Uplink Control Information ("UCI"), Transmit Receive Points ("TRP"), Transport Block ("TB"). As used herein, "HARQ-ACK" may represent collectively the Positive Acknowledge ("ACK") and the Negative Acknowledge ("NAK"). ACK means that a TB is correctly received while NAK means a TB is erroneously received.

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations, and a base station may perform wireless communication with UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 Ghz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied in NR Release 16, while a TRP is an apparatus to transmit and receive signals which is controlled by a gNB through the backhaul between the gNB and the TRP. For TRPs with non-ideal backhaul, Uplink Control Information (UCIs) corresponding to different TRPs should be separately transmitted to the different TRPs. Each TRP may have its PUCCH resource group to transmit its own UCIs. However, it is possible that one PUCCH resource carrying the UCI(s) transmitting to one TRP may overlap with another PUCCH resource carrying the UCI(s) transmitting to another TRP, thereby causing a collision on the UE side. Therefore, a mechanism or method for controlling UE's behavior when there is PUCCH collision on the UE side is desirable.

According to NR Release 15, all the PUCCH resources carrying different UCIs should be considered together by multiplexing or dropping to pick up at most two PUCCH resources to transmit. However, it may multiplex multiple UCIs corresponding to different TRPs in a PUCCH resource which is not allowed in multiple TRPs with non-ideal backhaul. Therefore, as the agreement in NR Release 16, since the UCIs corresponding to different TRPs should be transmitted separately, the UCIs corresponding to a same TRP should be handled together whatever multiplexing or dropping. Besides, since hybrid automatic repeat request acknowledgement (HARQ-ACK) information is very important for the network throughput, it should assure the HARQ-ACK information transmission as much as possible. However, in NR Release 15 specification, UE can transmit at most two PUCCH resources, at most one of which carries HARQ-ACK information. Accordingly, the PUCCH transmission should be enhanced in NR Release 16.

SUMMARY

According to a first aspect, there is provided an apparatus comprising: a transmitter for selectively transmitting a first physical uplink control channel (PUCCH) resource to a first identity, and selectively transmitting a second PUCCH resource to a second identity, wherein each one of the PUCCH resources carries a set of uplink control information (UCI); and a processor that determines whether there is an overlap between the first PUCCH resource and the second PUCCH resource.

According to a second aspect, there is provided an apparatus comprising: a receiver for receiving a first physical uplink control channel (PUCCH) resource and a second PUCCH resource, wherein both PUCCH resources are in a same PUCCH resource group associated with one identity; and a processor that determines whether Hybrid Automatic Repeat Request Acknowledgement (HARQ-ACK) information is expected to be received from one of the first and second PUCCH resources; wherein, upon determining that HARQ-ACK information is expected, the processor decodes both the first PUCCH resource and the second PUCCH resource; and, upon determining that HARQ-ACK information is not expected, the processor decodes only the first PUCCH resource.

According to a third aspect, there is provided a method comprising: providing a first physical uplink control channel (PUCCH) resource for transmission to a first identity, and a second PUCCH resource for transmission to a second identity, wherein each one of the PUCCH resources carries a set of uplink control information (UCI); determining, by a processor, whether there is an overlap between the first PUCCH resource and the second PUCCH resource; and controlling a transmitter for selectively transmitting the first PUCCH resource and/or the second PUCCH resource based on a result of the determination.

According to a fourth aspect, there is provided a method comprising: receiving, by a receiver, a first physical uplink control channel (PUCCH) resource and a second PUCCH resource, wherein both PUCCH resources are in a same PUCCH resource group associated with one identity; determining, by a processor, whether Hybrid Automatic Repeat Request Acknowledgement (HARQ-ACK) information is expected to be received from one of the first and second PUCCH resources; decoding, by the processor, both the first PUCCH resource and the second PUCCH resource, upon determining that HARQ-ACK information is expected; and decoding, by the processor, only the first PUCCH resource, upon determining that HARQ-ACK information is not expected.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
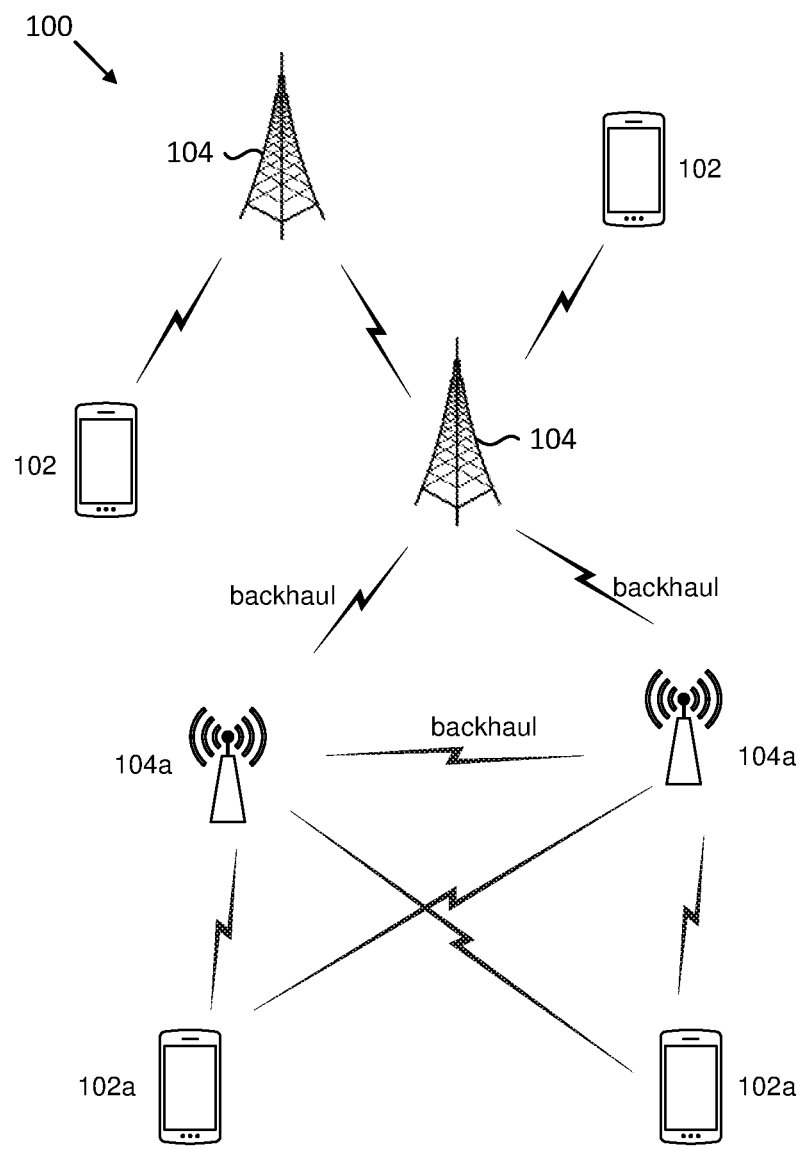
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100. In one embodiment, the wireless communication system 100 may include user equipment (UEs) 102 and network equipment (NEs) 104. Even though a specific number of UEs 102 and NEs 104 is depicted in FIG. 1, one skilled in the art will recognize that any number of UEs 102 and NEs 104 may be included in the wireless communication system 100.

The user equipment (UEs) 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

Network equipment (NEs) 104 may also be referred to as a base station, an access point, an access terminal, a base, a Node-B, an eNB, a gNB, a Home Node-B, a relay node, an apparatus, a device, or by any other terminology used in the art. Throughout this specification, a reference to base station may refer to any one of the above referenced types of the network equipment 104, such as eNB and gNB.

The network equipment 104 may be distributed over a geographic region. The network equipment 104 is generally part of a radio access network that includes one or more controllers communicably coupled to one or more corresponding network equipment 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with 3GPP 5G new radio (NR). In some implementations, the wireless communication system 100 is compliant with the 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The network equipment 104 may serve a number of UEs 102 within a serving area, for example, a cell (or a cell sector) or more cells via a wireless communication link. The network equipment 104 transmits DL communication signals to serve the UEs 102 in the time, frequency, and/or spatial domain.

The network equipment 104 may also include transmit receive points (TRPs) 104a. In some embodiments, the network equipment may be a gNB 104 that controls a number of TRPs 104a. A TRP is controlled by a gNB through the backhaul between the gNB and the TRP. And there is a backhaul between two TRPs 104a. In some other embodiments, the network equipment may be a TRP 104a that is controlled by a gNB.

Direct or indirect communication link between one NE 104 and another NE 104 may be provided.

Communication links are provided between the NEs 104, 104a and the UEs 102, 102a, which may be NR UL/DL communication links between a gNB 104, 104a and UE 102, 102a for example. Some UEs 102, 102a may simultaneously communicate with different Radio Access Technologies (RATs), such as NR and LTE.

In some embodiments, a UE 102a may be able to communicate with two or more transmit receive points (TRPs) with non-ideal backhaul, simultaneously. A TRP may be a transmission point of a gNB. Multiple beams may be used by the UE and/or TRP(s). The two or more TRPs may be TRPs of different gNBs, or a same gNB. A PUCCH resource group/pool composed of multiple PUCCH resources is associated with each TRP. Each TRP is associated with a group of control-resource set (coreset) IDs. A coreset is time-frequency resources where PDCCH is transmitted. Therefore, each TRP is associated with a coreset group.

Figure 2:
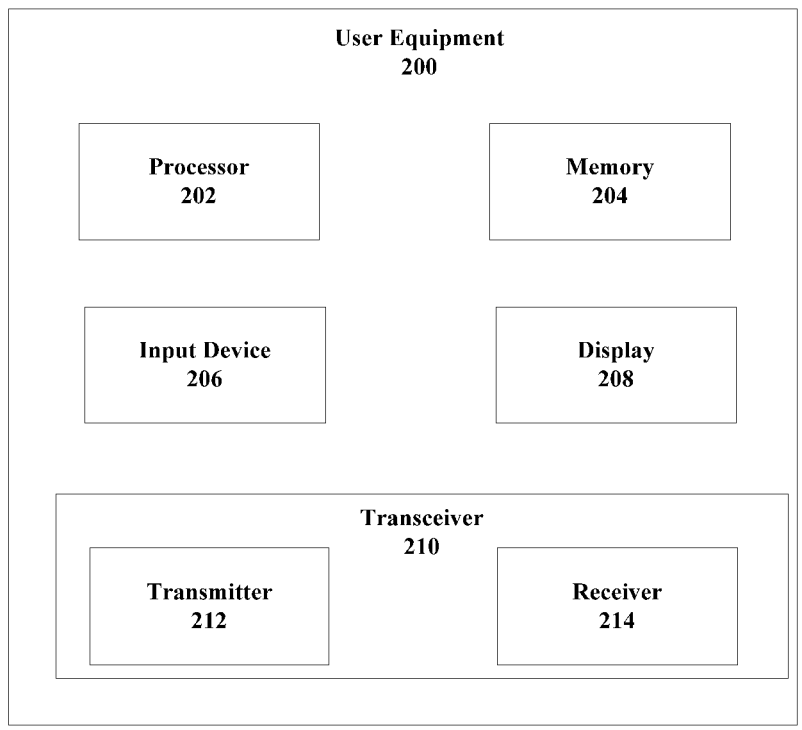
FIG. 2 is a schematic block diagram illustrating components of user equipment (UE) according to one embodiment.

FIG. 2 is a schematic block diagram illustrating components of user equipment (UE) according to one embodiment. The UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a HARQ-ACK including feedbacks for one or more DL transmissions. As another example, the receiver 214 may receive various configurations/data from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, UE 200 includes a plurality of transmitter 212 and receiver 214 pairs for communicating on a plurality of wireless networks and/or radio frequency bands, each transmitter 212 and receiver 214 pair configured to communicate on a different wireless network and/or radio frequency band from other transmitter 212 and receiver 214 pairs.

Figure 3:
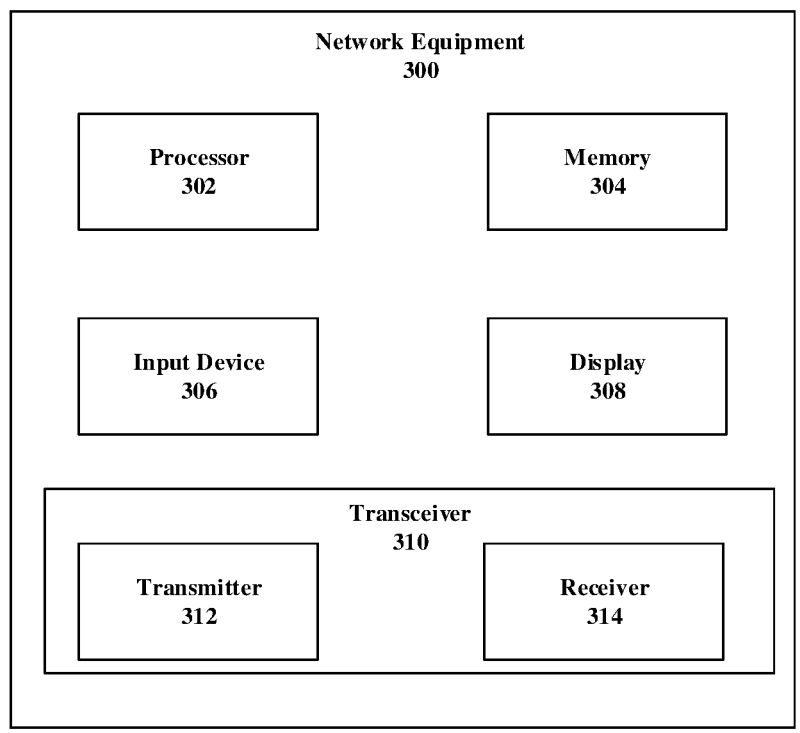
FIG. 3 is a schematic block diagram illustrating components of network equipment (NE) according to one embodiment.

FIG. 3 is a schematic block diagram illustrating components of network equipment (NE) according to one embodiment. The network equipment (NE) 300 may be an exemplary implementation of NE 104 of FIG. 1.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to UE 200. The processor 302 may also control the transceiver 310 to receive UL signals/data from UE 200. For example, the processor 302 may control the transceiver 310 to receive a HARQ-ACK including feedbacks for one or more DL transmissions. In another example, the processor 302 may control the transceiver 310 to transmit DL signals for various configurations to UE 200, as described above.

The transceiver 310, in one embodiment, is configured to communicate wirelessly with UE 200. In certain embodiments, the transceiver 310 comprises a transmitter 312 and a receiver 314. The transmitter 312 is used to transmit DL communication signals to UE 200 and the receiver 314 is used to receive UL communication signals from UE 200. For example, the receiver 314 may receive a HARQ-ACK codebook from UE 200. As another example, the transmitter 312 may transmit the various configurations/data of NE 300.

The transceiver 310 may communicate simultaneously with a plurality of UEs 200. For example, the transmitter 312 may transmit DL communication signals to UE 200. As another example, the receiver 314 may simultaneously receive UL communication signals from UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, NE 300 may serve multiple cells and/or cell sectors, wherein the transceiver 310 includes a transmitter 312 and a receiver 314 for each cell or cell sector.

Assume on a UE side, there is a PUCCH resource (PUCCH resource 1) carrying a first UCI (including a first HARQ-ACK and/or a first CSI) transmitting for a first TRP in a time interval (this time interval may be slot/subframe/mini-slot, and in NR, it is slot), and there is another PUCCH resource (PUCCH resource 2) carrying a second UCI (including a second HARQ-ACK and/or a second CSI) transmitting for a second TRP in the same time interval. The PUCCH resource determination in each TRP may be the same as that of NR Release 15 specification.

It is noted that this description and the claims make no specific distinction between PUCCH resource 1 and PUCCH resource 2, which may be also referred to as a first PUCCH resource and a second PUCCH resource respectively. Accordingly, the first PUCCH resource in some embodiments may be referred to as the second PUCCH resource in some other embodiments. Similarly, PUCCH resource 3, PUCCH resource 4, PUCCH resource pair 1, and PUCCH resource pair 2, may also be referred to as a third PUCCH resource, a fourth PUCCH resource, a first PUCCH resource pair, and a second PUCCH resource pair, respectively.

Figure 4:
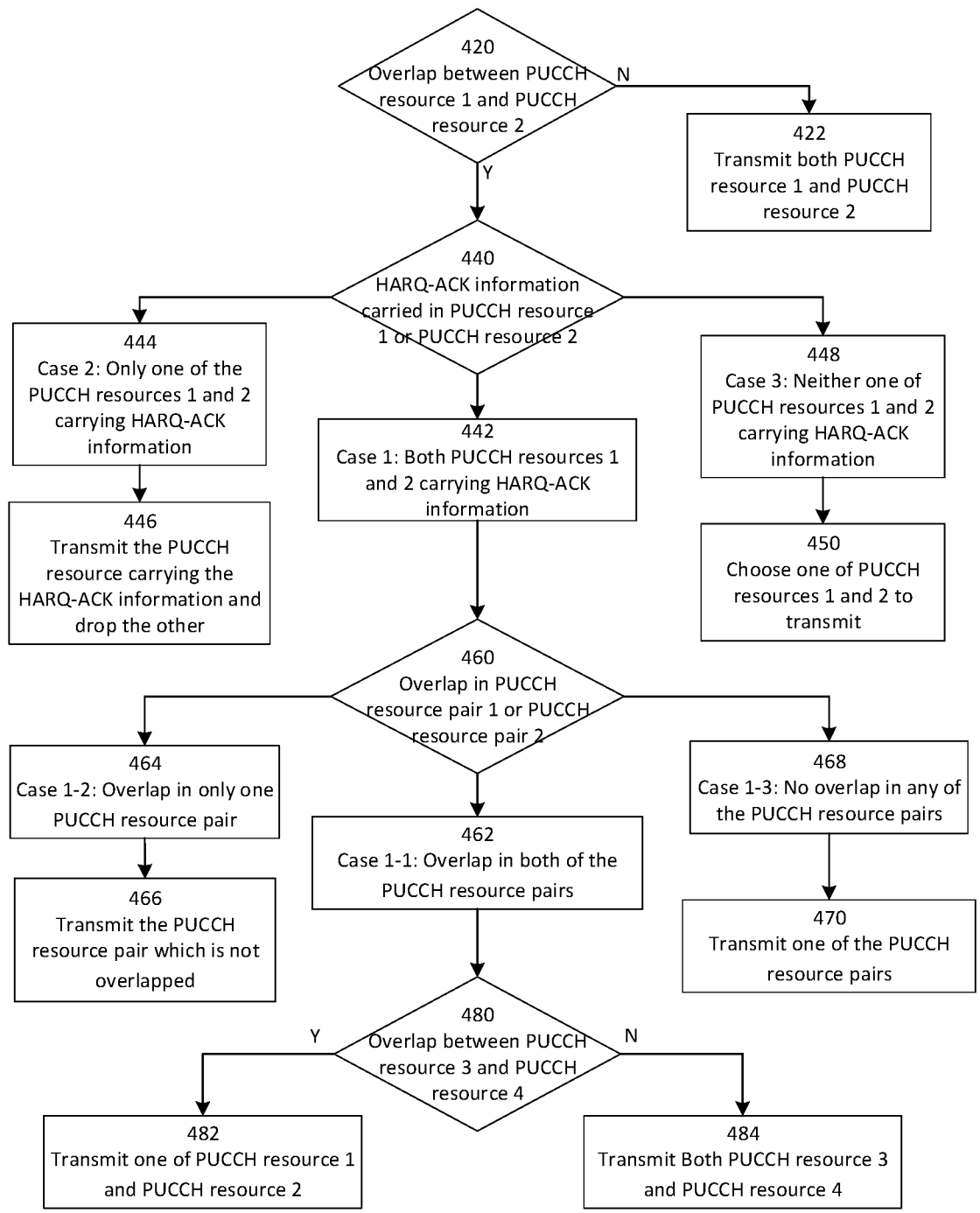
FIG. 4 is a schematic flow diagram of a PUCCH transmission process under various circumstances.

FIG. 4 is a schematic flow diagram of a PUCCH transmission process under various circumstances.

The mechanism provides a first physical uplink control channel (PUCCH) resource for transmission to a first identity, i.e. the first TRP, and a second PUCCH resource for transmission to a second identity, i.e. the second TRP. Each one of the PUCCH resources carries a set of uplink control information (UCI).

Initially, a processor 202 checks, or determines, whether there is an overlap between the first PUCCH resource and the second PUCCH resource 420. The term overlap here may refer to the fact that the two PUCCH resources occupy at least one same symbol, i.e. an overlap in the time space or a time conflict. In some embodiments, it does not matter whether there is any overlap in the frequency space.

The processor 202 then controls a transmitter 212 to selectively transmit the first PUCCH resource and/or the second PUCCH resource based on a result of the checking, or determination. That is, according to the result of the determination, the transmitter 212 may transmit only one of the PUCCH resources, both of the PUCCH resources, or even none of the PUCCH resources.

Each one of the first identity and the second identity is associated with a control-resource set (corset) group. Coreset is a set of physical resources (i.e, a specific area on NR Resource Grid) and a set of parameters that are used to carry PDCCH/DCI. The RRC parameters defining the coreset include a coreset ID in the controlResourceSetId field, with value 0 identifying the common coreset configured in MIB and in ServingCellConfigCommon, and values 1 . . . maxNrofControlResourceSets-1 identifying coresets configured by dedicated signaling. The controlResourceSetId is unique among the BWPs of a ServingCell.

The UCI may include only HARQ-ACK, only CSI, or both HARQ-ACK and CSI. In some embodiments, a set of UCI may be a combination of HARQ-ACK information and CSI.

As shown in FIG. 4, if it is determined that there is no overlap between the first PUCCH resource and the second PUCCH resource, the UE should transmit both of the PUCCH resources in the time interval. That is, both the first PUCCH resource and the second PUCCH resource are transmitted 422.

Otherwise, the UE further checks 440 if there is any HARQ-ACK information carried in either PUCCH resource 1 or PUCCH resource 2. That is, if it is determined that there is an overlap between the first PUCCH resource and the second PUCCH resource, the processor 202 further checks whether the first PUCCH resource carries HARQ-ACK information; and whether the second PUCCH resource carries HARQ-ACK information. Depending on the results of the checking, there may be three cases:

Case 1: Both of PUCCH resource 1 and PUCCH resource 2 carry HARQ-ACK information 442;

Case 2: Only one PUCCH resource of PUCCH resource 1 and PUCCH resource 2 carries HARQ-ACK information 444; and Case 3: Neither one of PUCCH resource 1 and PUCCH resource 2 carries HARQ-ACK information 448.

CASE 1

In case 1, it is determined that both the first PUCCH resource and the second PUCCH resource carry HARQ-ACK information 442.

The processor further checks 460 whether there is an overlap in a first resource pair comprising the first PUCCH resource and a fourth PUCCH resource; and whether there is an overlap in a second resource pair comprising the second PUCCH resource and a third PUCCH resource. The third PUCCH resource carries only HARQ-ACK information for the first identity or the first TRP; and the fourth PUCCH resource carries only HARQ-ACK information for the second identity or the second TRP.

The third PUCCH resource and the fourth PUCCH resource may be determined using NR Release 15 scheme based on the number of the UCI information bits including HARQ-ACK information bits and the corresponding PDCCH, wherein the UCI information including HARQ-ACK information determines a PUCCH resource set first, and the PUCCH resource indicator carried in the corresponding PDCCH determines which PUCCH resource in the PUCCH resource set is used if the number of PUCCH resources in the PUCCH resource set is no more than 8, or the PUCCH resource indicator carried in the corresponding PDCCH and the first CCE (control channel element) index in the corresponding PDCCH determine which PUCCH resource is used if the number of PUCCH resources in the PUCCH resource set is larger than 8.

For example, the resource carrying only the first HARQ-ACK information for the first TRP is PUCCH resource 3 and the resource carrying only the second HARQ-ACK information for the second TRP is PUCCH resource 4 according to NR Release 15 scheme. A first resource pair, i.e. PUCCH resource pair 1, is defined as being composed of PUCCH resource 1 and PUCCH resource 4. A second resource pair, i.e. PUCCH resource pair 2, is defined as being composed of PUCCH resource 3 and PUCCH resource 2.

In some embodiments, PUCCH resource 1 and PUCCH resource 3 may be a same resource, and PUCCH resource 2 and PUCCH resource 4 may be a same resource according to NR Release 15 specification wherein the PUCCH resource carrying at least HARQ-ACK is determined by the payload size transmitted in the resource and the corresponding PDCCH to the HARQ-ACK.

The UE further checks 460 whether there is an overlap between the PUCCH resource 3 carrying only HARQ-ACK information for the first TRP and the PUCCH resource 2 carrying the whole UCI for the second TRP, i.e. an overlap in the second PUCCH resource pair. Similarly, the UE also checks 460 whether there is an overlap between the PUCCH resource 4 carrying only HARQ-ACK information for the second TRP and the PUCCH resource 1 carrying the whole UCI for the first TRP, i.e. an overlap in the first PUCCH resource pair. According to the checking result, there may be further three cases:

Case 1-1: There is an overlap in both the first resource pair and the second resource pair 462;
Case 1-2: There is an overlap in the first resource pair and there is no overlap in the second resource pair 464; and
Case 1-3: There is no overlap in the first resource pair and there is no overlap in the second resource pair 468.

In case 1-1, the two PUCCH resource pairs are both overlapped 462, then UE will further check 480 whether PUCCH resource 3 carrying the first HARQ-ACK information and PUCCH resource 4 carrying the second HARQ-ACK information are overlapped. That is, the processor checks whether there is an overlap between the third PUCCH resource and the fourth PUCCH resource. If they are not overlapped, the UE will 484 transmit both PUCCH resource 3 and PUCCH resource 4. If they are overlapped, the UE will 482 choose one PUCCH resource out of PUCCH resource 1 and PUCCH resource 2 to transmit. Accordingly, the transmitter may transmit a selected one of the first PUCCH resource and the second PUCCH resource, and the other PUCCH resource may be dropped.

It may be up to UE's implementation to choose one PUCCH resource out of PUCCH resource 1 and PUCCH resource 2 to transmit. Alternatively, the selection may be performed under some predefined rules. For example, it may always select one of the first PUCCH resource and the second PUCCH resource that carries a larger number of HARQ-ACK information bits than the other.

In case 1-2, there is only one PUCCH resource pair out of PUCCH resource pair 1 and PUCCH resource pair 2 that is not overlapped 464. Namely, in one resource pair, the two PUCCH resources for transmitting to TRP 1 and TRP 2 respectively are not overlapped, and then the UE will transmit the two PUCCH resources in this resource pair 466.

Specifically, if it is determined that there is an overlap in the first resource pair and there is no overlap in the second resource pair, the transmitter may transmit the second resource pair, and the first resource pair may be dropped. Similarly, if it is determined that there is an overlap in the second resource pair and there is no overlap in the first resource pair, the transmitter may transmit the first resource pair, and the second resource pair may be dropped.

For example, only PUCCH resource pair 1 is not overlapped, and then the UE will transmit PUCCH resource 1 carrying the first HARQ-ACK information for the first TRP and PUCCH resource 4 carrying the second UCI for the second TRP.

In case 1-3, neither one of the two PUCCH resource pairs is overlapped 468. The UE will choose one pair out of two PUCCH resource pairs to transmit 470. It may be up to UE's implementation to choose one PUCCH resource pair out of PUCCH resource pair 1 and PUCCH resource pair 2. Alternatively, the selection may be performed under some predefined rules. For example, the UE may always choose the PUCCH resource pair carrying a larger number of UCI information bits carried in the PUCCH resource pair to transmit.

CASE 2

In case 2, only one PUCCH resource of PUCCH resource 1 and PUCCH resource 2 carries HARQ-ACK information 444.

The PUCCH resource carrying the UCI including HARQ-ACK information should be transmitted 446. And the PUCCH resource carrying the UCI including no HARQ-ACK information may be dropped and not be transmitted.

If it is determined that the first PUCCH resource carries HARQ-ACK information and that the second PUCCH resource does not carry HARQ-ACK information, the transmitter may transmit the first PUCCH resource, and the second PUCCH resource may be dropped. Similarly, if it is determined that the second PUCCH resource carries HARQ-ACK information and that the first PUCCH resource does not carry HARQ-ACK information, the transmitter may transmit the second PUCCH resource, and the first PUCCH resource may be dropped.

For example, in some embodiments, PUCCH resource 1 carries HARQ-ACK information in it but PUCCH resource 2 does not carry HARQ-ACK information in it, and then the UE only transmits PUCCH resource 1 carrying the first UCI and drop PUCCH resource 2 carrying the second UCI.

CASE 3

In case 3, neither one of PUCCH resource 1 and PUCCH resource 2 carries HARQ-ACK information 448.

The transmitter may transmit a selected one of the first PUCCH resource and the second PUCCH resource, and the other PUCCH resource may be dropped 450. It may be up to UE's implementation to choose one PUCCH resource out of PUCCH resource 1 and PUCCH resource 2 to transmit. Alternatively, the selection may be performed under some predefined rules. For example, it may always select one of the first PUCCH resource and the second PUCCH resource that carries a larger number of UCI information bits than the other.

Each TRP should decode blindly at most two PUCCH resources. If there is HARQ-ACK information that should be received by the TRP in this time interval, the TRP should decode, blindly, the PUCCH resource carrying only HARQ-ACK information and the PUCCH resource carrying all the UCIs for the TRP. If there is no HARQ-ACK information that should be received by the TRP, it only need to decode the PUCCH resource carrying all the UCIs.

In some embodiments, a receiver 314, or TRP/gNB, may receive a first physical uplink control channel (PUCCH) resource and/or a second PUCCH resource. Both PUCCH resources are in a same PUCCH resource group associated with one identity, or TRP.

The TRP may include a processor that checks whether Hybrid Automatic Repeat Request Acknowledgement (HARQ-ACK) information is expected to be received from one of the first and second PUCCH resources.

In some embodiments, the first PUCCH resource may carry a set of uplink control information (UCI) comprising Hybrid Automatic Repeat Request Acknowledgement (HARQ-ACK) information and/or Channel State Information (CSI). The second PUCCH resource carries only HARQ-ACK information. If it is determined that HARQ-ACK information is expected, the processor may decode both the first PUCCH resource and the second PUCCH resource. If it is determined that HARQ-ACK information is not expected, the processor may decode only the first PUCCH resource.

Figure 5:
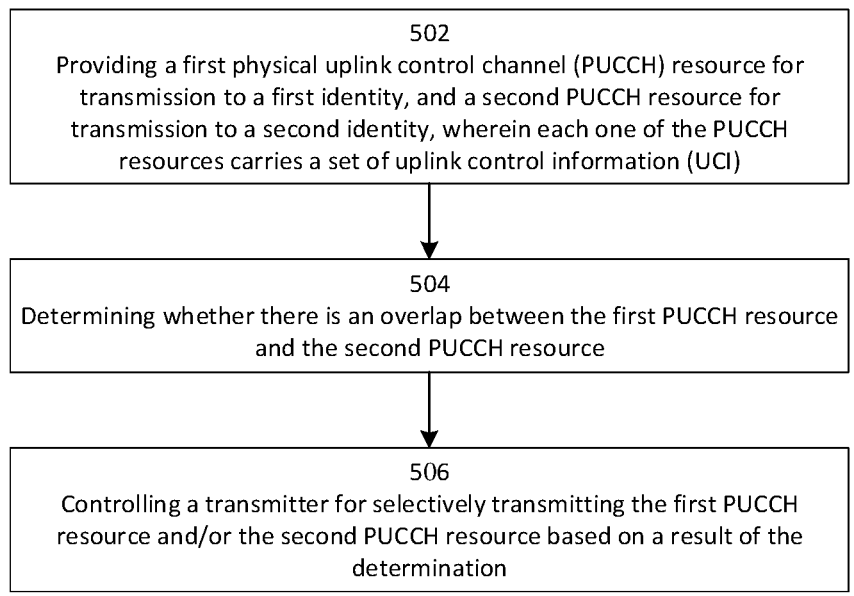
FIG. 5 is a flow chart illustrating steps of PUCCH transmission.

FIG. 5 is a flow chart illustrating steps of PUCCH transmission.

In step 502, a first physical uplink control channel (PUCCH) resource for transmission to a first identity, and a second PUCCH resource for transmission to a second identity, are provided. Each one of the PUCCH resources carries a set of uplink control information (UCI).

In step 504, a processor 202 of the UE 200 determines whether there is an overlap between the first PUCCH resource and the second PUCCH resource.

In step 506, based on a result of the determination, the processor 202 controls the transmitter 212 for selectively transmitting the first PUCCH resource and/or the second PUCCH resource. Namely, according to the determination, the transmitter 212 may transmit only one of the PUCCH resources, both of the PUCCH resources, or even none of the PUCCH resources.

Figure 6:
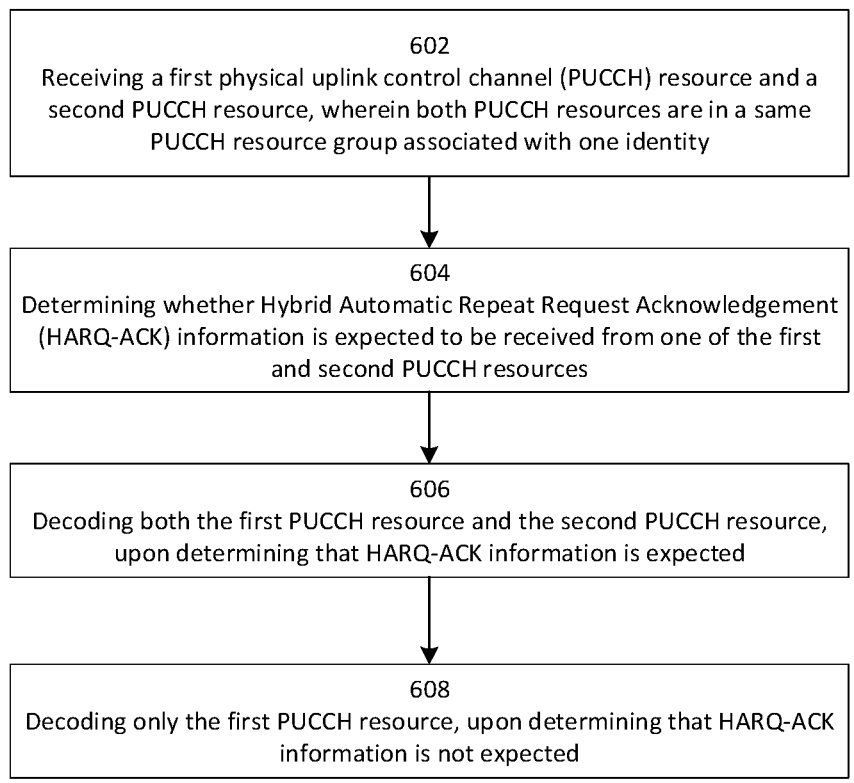
FIG. 6 is a flow chart illustrating steps of PUCCH reception.

FIG. 6 is a flow chart illustrating steps of PUCCH reception.

In step 602, the receiver 314, or TRP/gNB, may receive a first physical uplink control channel (PUCCH) resource and a second PUCCH resource, wherein both PUCCH resources are in a same PUCCH resource group associated with one identity, or TRP.

In step 604, a processor 302 determines whether Hybrid Automatic Repeat Request Acknowledgement (HARQ-ACK) information is expected to be received from one of the first and second PUCCH resources.

In some embodiments, the first PUCCH resource may carry a set of uplink control information (UCI) comprising Hybrid Automatic Repeat Request Acknowledgement (HARQ-ACK) information and/or Channel State Information (CSI). The second PUCCH resource carries only HARQ-ACK information.

In step 606, if it is determined that HARQ-ACK information is expected, the processor 302 may decode both the first PUCCH resource and the second PUCCH resource.

In step 608, if it is determined that HARQ-ACK information is not expected, the processor 302 may decode only the first PUCCH resource.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE), comprising:
   at least one memory; and
   at least one processor coupled with the at least one memory and configured to cause the UE to:
   selectively transmit on a first physical uplink control channel (PUCCH) resource to a first identity, and selectively transmit on a second PUCCH resource to a second identity, wherein each one of the PUCCH resources carries a set of uplink control information (UCI);
   determine whether there is an overlap between the first PUCCH resource and the second PUCCH resource;
   upon determining that there is an overlap between the first PUCCH resource and the second PUCCH resource, determine whether the first PUCCH resource carries hybrid automatic repeat request acknowledgement (HARQ-ACK) information; and
   selectively transmit the first PUCCH resource and/or the second PUCCH resource based on a result of the determination.

2. The UE of claim 1, wherein each one of the first identity and the second identity is associated with a control-resource set group.

3. The UE of claim 1, wherein the set of UCI comprises:
   HARQ-ACK information; and/or
   channel state information (CSI).

4. The UE of claim 1, wherein, upon determining that neither one of the first PUCCH resource and the PUCCH resource carries HARQ-ACK information, the at least one processor is configured to cause the UE to transmit a selected one of the first PUCCH resource and the second PUCCH resource.

5. The UE of claim 1, wherein, upon determining that the first PUCCH resource carries HARQ-ACK information and that the second PUCCH resource does not carry HARQ-ACK information, the at least one processor is configured to cause the UE to transmit the first PUCCH.

6. A method at a user equipment (UE), the method comprising:
   providing a first physical uplink control channel (PUCCH) resource for transmission to a first identity, and a second PUCCH resource for transmission to a second identity, wherein each one of the PUCCH resources carries a set of uplink control information (UCI);
   determining whether there is an overlap between the first PUCCH resource and the second PUCCH resource;
   upon determining that there is an overlap between the first PUCCH resource and the second PUCCH resource, determine whether the first PUCCH resource carries hybrid automatic repeat request acknowledgement (HARQ-ACK) information; and
   selectively transmitting the first PUCCH resource and/or the second PUCCH resource based on a result of the determination.

7. The method of claim 6, wherein each one of the first identity and the second identity is associated with a control-resource set group.

8. The method of claim 6, wherein the set of UCI comprises:
   HARQ-ACK information; and/or
   channel state information (CSI).

9. The method of claim 6, further comprising, upon determining that there is an overlap between the first PUCCH resource and the second PUCCH resource, determining whether the second PUCCH resource carries HARQ-ACK information.

10. The method of claim 9, further comprising, upon determining that neither one of the first PUCCH resource and the second PUCCH resource carries HARQ-ACK information, controlling the transmitter to transmit a selected one of the first PUCCH resource and the second PUCCH resource.

11. The method of claim 10, wherein the selected one of the first PUCCH resource and the second PUCCH resource carries a larger number of UCI information bits.

12. The method of claim 9, further comprising, upon determining that the first PUCCH resource carries HARQ-ACK information and that the second PUCCH resource does not carry HARQ-ACK information, controlling the transmitter to transmit the first PUCCH resource.

13. The method of claim 9, further comprising, upon determining that both the first PUCCH resource and the second PUCCH resource carry HARQ-ACK information, determining:

whether there is an overlap in a first resource pair comprising the first PUCCH resource and a fourth PUCCH resource; and whether there is an overlap in a second resource pair comprising the second PUCCH resource and a third PUCCH resource;

wherein the third PUCCH resource carries only HARQ-ACK information for the first identity; and the fourth PUCCH resource carries only HARQ-ACK information for the second identity.

14. The method of claim 13, further comprising, upon determining that there is no overlap in the first resource pair and there is no overlap in the second resource pair, transmitted a selected pair of the first resource pair and the second resource pair.

15. The method of claim 13, further comprising, upon determining that there is an overlap in the first resource pair and there is no overlap in the second resource pair, transmitting the second resource pair.

16. The method of claim 13, further comprising, upon determining that there is an overlap in both the first resource pair and the second resource pair, determining whether there is an overlap between the third PUCCH resource and the fourth PUCCH resource.

17. The method of claim 16, further comprising, upon determining that there is no overlap between the third PUCCH resource and the fourth PUCCH resource, transmitting both the third PUCCH resource and the fourth PUCCH resource.

18. A method at a base station, the method comprising:
receiving a first physical uplink control channel (PUCCH) resource and a second PUCCH resource, wherein both PUCCH resources are in a same PUCCH resource group associated with one identity;
determining whether HARQ-ACK information is expected to be received from one of the first and second PUCCH resources;
decoding both the first PUCCH resource and the second PUCCH resource, upon determining that HARQ-ACK information is expected; and
decoding only the first PUCCH resource, upon determining that HARQ-ACK information is not expected.

19. A base station, comprising:
at least one memory; and
at least one processor coupled with the at least one memory and configured to cause the base station to:
receive a first physical uplink control channel (PUCCH) resource and a second PUCCH resource, wherein both PUCCH resources are in a same PUCCH resource group associated with one identity;
determine whether HARQ-ACK information is expected to be received from one of the first and second PUCCH resources;
decode both the first PUCCH resource and the second PUCCH resource, upon determining that HARQ-ACK information is expected; and
decode only the first PUCCH resource, upon determining that HARQ-ACK information is not expected.

* * * * *